US011873672B2

(12) United States Patent
Caione et al.

(10) Patent No.: US 11,873,672 B2
(45) Date of Patent: Jan. 16, 2024

(54) HINGE FOR DOORS OF REFRIGERATED CABINETS

(71) Applicant: CISAPLAST S.P.A., Suzzara (IT)

(72) Inventors: Stefano Caione, Levata di Curtatone (IT); Claudio Ciofi, Sesto Fiorentino (IT)

(73) Assignee: CISAPLAST S.P.A., Suzzara (IT)

( * ) Notice: Subject to any disclaimer, the term of this patent is extended or adjusted under 35 U.S.C. 154(b) by 151 days.

(21) Appl. No.: 17/604,595

(22) PCT Filed: Apr. 9, 2020

(86) PCT No.: PCT/IB2020/053405
§ 371 (c)(1),
(2) Date: Oct. 18, 2021

(87) PCT Pub. No.: WO2020/212812
PCT Pub. Date: Oct. 22, 2020

(65) Prior Publication Data

US 2022/0195777 A1 Jun. 23, 2022

(30) Foreign Application Priority Data

Apr. 19, 2019 (IT) ........................ 102019000006160

(51) Int. Cl.
*E05F 3/20* (2006.01)

(52) U.S. Cl.
CPC ............. *E05F 3/20* (2013.01); *E05Y 2201/11* (2013.01); *E05Y 2201/474* (2013.01);
(Continued)

(58) Field of Classification Search
CPC ... E05F 3/20; E05F 3/104; E05F 3/106; E05F 3/16; E05F 3/00; E05Y 2201/11;
(Continued)

(56) References Cited

U.S. PATENT DOCUMENTS 969,150 A * 9/1910 Andersen .................. E05F 3/16 16/65
1,217,414 A * 2/1917 Collins ..................... E05F 3/16 16/65
(Continued)

FOREIGN PATENT DOCUMENTS

JP S60188585 A 9/1985
JP 2003129740 A 5/2003
WO 2017077491 A1 5/2017

*Primary Examiner* — Victor D Batson
*Assistant Examiner* — Matthew J Sullivan
(74) *Attorney, Agent, or Firm* — Browdy and Neimark, PLLC

(57) ABSTRACT

The invention relates to a hinge (10) for closing panels of the access opening of refrigerated cabinets, where said hinge (10) comprises: —a casing that can be fixed to a fixed frame of the access opening, where said casing contains a mechanism configured to allow tire rotation of said panel about an axis (X) between a closed position and an open position of the access opening of the refrigerated cabinet, —an elastic return means (53) to allow the return from the open position to the closed position of the panel; characterised in that said hinge (10) comprises a braking element (100) configured to interact with the aforesaid mechanism to brake the closing movement of the panel generated by said elastic return means (53).

8 Claims, 2 Drawing Sheets

(52) U.S. Cl.
CPC ... *E05Y 2201/626* (2013.01); *E05Y 2201/638* (2013.01); *E05Y 2900/202* (2013.01); *E05Y 2900/31* (2013.01)

(58) Field of Classification Search
CPC ......... E05Y 2201/474; E05Y 2201/626; E05Y 2201/638; E05Y 2201/26; E05Y 2900/202; E05Y 2900/31
See application file for complete search history.

(56) References Cited

U.S. PATENT DOCUMENTS

| | | | | | |
|---|---|---|---|---|---|
| 1,331,329 | A * | 2/1920 | Durant | E05F 3/16 116/164 |
| 1,398,504 | A * | 11/1921 | Enache | E05F 3/16 16/49 |
| 4,583,324 | A * | 4/1986 | Storz | E05F 5/12 49/367 |
| 5,680,674 | A * | 10/1997 | Guthrie | E05F 3/106 16/53 |
| 6,711,778 | B2 * | 3/2004 | Sparkman | E05C 17/203 16/82 |
| 7,192,105 | B2 * | 3/2007 | Jung | E05F 5/02 312/405 |
| 8,640,305 | B2 * | 2/2014 | Pecar | E05F 5/006 16/50 |
| 8,793,838 | B2 * | 8/2014 | McKibben | E05F 3/00 16/72 |
| 9,810,012 | B2 * | 11/2017 | Bacchetti | E05F 3/20 |
| 10,633,903 | B2 * | 4/2020 | Benedetti | E05D 5/10 |
| 11,215,001 | B2 * | 1/2022 | Cai | E05F 3/22 |
| 11,280,126 | B2 * | 3/2022 | Seppänen | E05F 3/227 |
| 2008/0000159 | A1 * | 1/2008 | Gilbert | E05D 15/30 49/345 |
| 2022/0195777 | A1 * | 6/2022 | Caione | E05F 3/16 |
| 2022/0298840 | A1 * | 9/2022 | Benedetti | E05F 3/12 |
| 2022/0356740 | A1 * | 11/2022 | Bacchetti | E05F 3/104 |
| 2023/0112987 | A1 * | 4/2023 | Kim | E05F 15/614 49/334 |

* cited by examiner

HINGE FOR DOORS OF REFRIGERATED CABINETS

FIELD OF THE INVENTION

The present invention relates to a hinge for doors of refrigerated cabinets or refrigerators.

More in particular, the invention relates to a hinge for doors of refrigerated cabinets or refrigerators intended to be placed inside points of sale of food products or the like, for the storage and display of such products.

PRIOR ART

As is known, refrigerated cabinets generally comprise a parallelepiped shaped outer body, which is adapted to delimit internally a refrigerated compartment for housing the products to be stored.

The refrigerated compartment is accessible through a front access opening obtained on a side flank of the outer body, which is closed by a door that can be partially or fully transparent, so as to allow the viewing of the products that are contained therein.

Currently, the door of a refrigerated cabinet can be a swing or alternatively sliding door.

In particular a swing door comprises a fixed frame adapted to delimit the access opening of the refrigerated cabinet and one or more panels adapted to close said access opening, which are hinged to the frame, so as to open the access opening by rotation in the form of a leaf.

A typical problem of such embodiments is that the swing doors that close refrigerated cabinets in points of sale of food products are subject to continuous opening and closing by customers interested in accessing the products contained in the cabinets, which often causes swing doors to bang against the refrigerated cabinet when closed.

An aim of the present invention is that of solving such problem by providing a hinge that acts to as to prevent strong impacts of swing doors against the refrigerated cabinet.

It is a further object of the present invention to obtain the aforesaid result in a rational and cheap manner.

BRIEF SUMMARY OF THE INVENTION

Such objects are achieved by the features of the invention given in the independent claim. The dependent claims outline preferred and/or particularly advantageous aspects of the invention.

Therefore, the present invention sets out to reach the aforesaid aims through a hinge for closing panels of the access opening of refrigerated cabinets, where said hinge comprises:

- a casing that can be fixed to a fixed frame of the access opening, where said casing contains a mechanism configured to allow the rotation of said panel about an axis between a closed position and an open position of the access opening of the refrigerated cabinet,
- an elastic return means to allow the return from the open position to the closed position of the panel;

characterised in that said hinge comprises a braking element configured to interact with the aforesaid mechanism to brake the closing movement of the panel generated by said elastic return means.

An advantage of such embodiment comes from the fact that the braking element acts so as to brake the panel of the door of the refrigerated cabinet preventing it from banging against the refrigerated cabinet or the frame thereof.

In one embodiment of the invention, the braking element comprises a lever configured to interact in oscillation with the mechanism that allows the rotation of said panel about the axis of rotation of the panel, where said oscillation movement takes place from a first position in which the lever does not interfere with the movement of the aforesaid mechanism to a second position wherein said lever interacts with the mechanism to brake the closing movement of the panel.

According to an embodiment of the invention, the mechanism configured to allow the rotation of said panel about the hinging axis thereof comprises a crank adapted to be placed in rotation by the opening and closing movement of the panel, said crank being kinematically connected to a connecting rod in turn connected to a piston.

According to a further embodiment of the invention, the elastic return means for the return from the open position to the closed position of the panel comprises a spring configured to act on the piston.

An advantage of such embodiment comes from the fact that, when the panel is in the completely open position, the spring is in its maximum compression position and exerts a force on the piston in an axial direction, where said force is balanced by the alignment of the connecting rod with the piston itself so as to keep the panel open.

Further features of the invention can be inferred by the dependent claims.

BRIEF DESCRIPTION OF THE DRAWINGS

Further features and advantages of the invention will be more apparent in the light of the following detailed description with the aid of the accompanying drawing tables, wherein.

DETAILED DESCRIPTION OF SOME EMBODIMENTS OF THE PRESENT INVENTION

Figure 1:
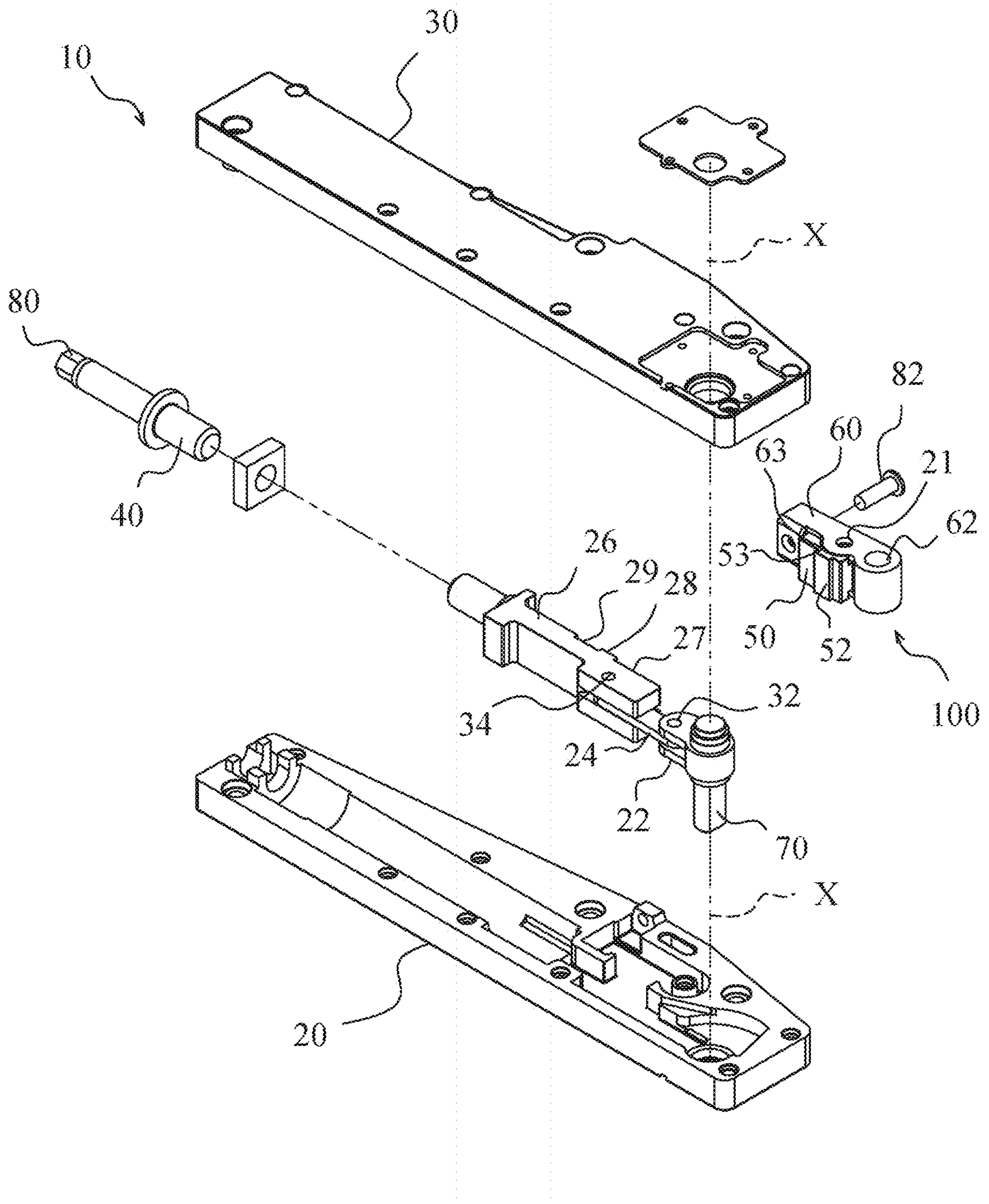
FIG. 1 illustrates an exploded view of an embodiment of the hinge for panels of doors of refrigerated cabinets according to an embodiment of the invention.

The invention will now be described with initial reference to FIG. 1 which represents an exploded view of the hinge for closing panels of the access opening of refrigerated cabinets according to an embodiment of the invention, indicated overall with reference number 10.

The hinge 10 has a casing for containing the operating mechanisms of the hinge 10 itself, said casing comprising a lower half-shell 20 that can be coupled to an upper half-shell 30.

The casing of the hinge 10 can be fixed to a fixed frame of the access opening of the refrigerated cabinet and contains a mechanism configured to allow the rotation of a panel or a leaf of the door about a hinging axis (X) between a closed position and an open position of the access opening of the refrigerated cabinet.

Such mechanism, in particular, comprises a connecting rod-crank kinematic mechanism, comprising a crank 22, that rotates about a hinging axis X, said crank 22 being connected to a closing panel of a refrigerated cabinet, e.g. through a known system comprising a prismatic rod 70.

The kinematic mechanism further comprises a connecting rod 24, connected by means of a first hinging point 32 to the crank 22, said connecting rod 24 being in turn connected by means of a second hinging point 34 to a piston 26.

The piston 26 has a particular conformation in which, along the stem of the piston 26 there is a raised element 28 that contributes to defining a seat 27 being proximal with respect to the crank 22 and a seat 29 being distal with respect to the crank 22.

Figure 4:
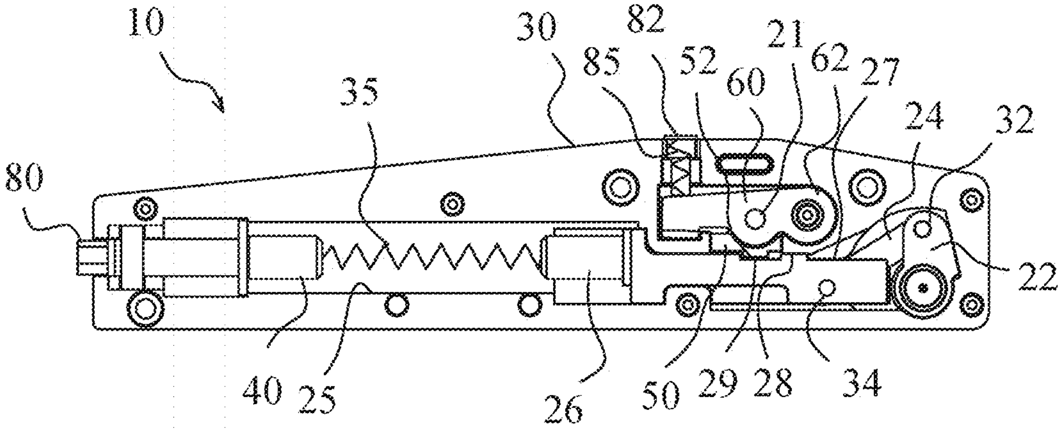
FIG. 4 illustrates a sectional view of the hinge of FIG. 1 in a configuration in which the panel with which it is associated is closed.

In turn the piston 26 can slide within a seat 25 thereof, from a position of maximum distance with respect to the hinging axis X (FIG. 2) of the panel to a position of minimum distance with respect to the hinging axis X of the panel (FIG. 4).

Within the seat 25 of the piston 26 there is also a spring 35 that is interposed between the distal end of the piston with respect to the hinging axis X and an abutment element 40 of the spring 35.

The spring 35 can therefore assume a maximum compression configuration when the piston 26 is at a maximum distance position with respect to the hinging axis X (FIG. 2) and a maximum extension configuration when the piston 26 is at a minimum distance position with respect to the hinging axis X.

The position of the abutment element 40 of the spring 35 can be adjusted through the use of a nut 80 in order to adjust the force of the spring 35.

Inside the casing of the hinge 10 there is also a brake or a braking element, indicated overall with reference number 100, configured to slow down the closure of the panel.

In particular, the brake 100 is configured to act on the stroke of the piston 35.

The brake 100 is composed of two parts that interact with each other, i.e. a skid 50 and a lever 60.

The skid 50 has on one side a raised element 52 and on the opposite side a concave surface 53 (FIG. 1) and can perform small oscillations about the axis 21.

In turn the lever 60 is pivoted (in 62) and has on one side a convex surface 63 adapted to cooperate with the concave surface 53 of the skid 50 (FIG. 1). Alternatively, the surface 53 of the skid 50 could be convex and the surface 63 of the lever 60 could be concave.

Furthermore, on the lever 60, in a position opposite the fulcrum 62, a spring 85 acts which opposes a resistant force to the oscillation of the lever 60 about the fulcrum 62.

The resistant force of the spring 85 can be adjusted by means of a set screw 82.

Figure 2:
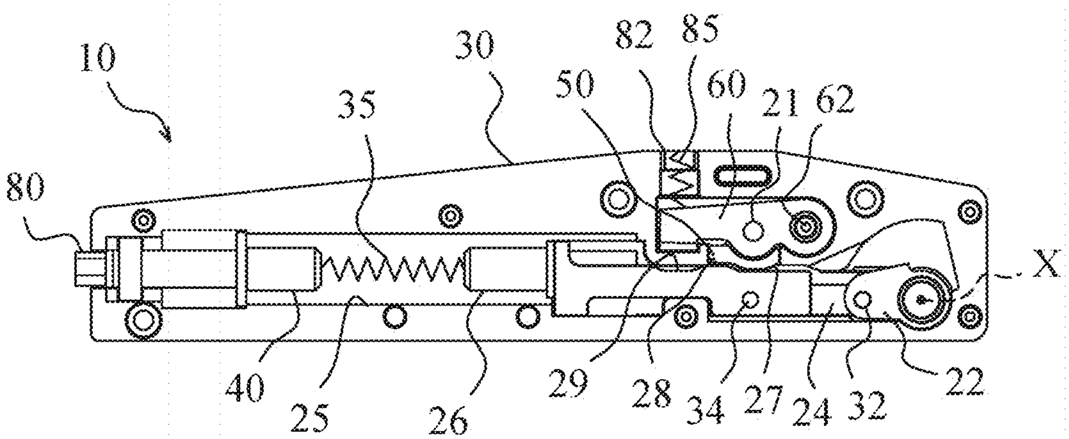
FIG. 2 illustrates a sectional view of the hinge of FIG. 1 in a configuration in which the panel with which it is associated is open.

In the position of the hinge 10 of FIG. 2, the raised element 52 of the skid 50 is engaged with the seat 27 being proximal with respect to the crank 22 of the piston, whereas in the position of the hinge 10 of FIG. 4, the raised element 52 of the skid 50 is engaged with the seat 29 being distal with respect to the crank 22 of the piston.

Figure 3:
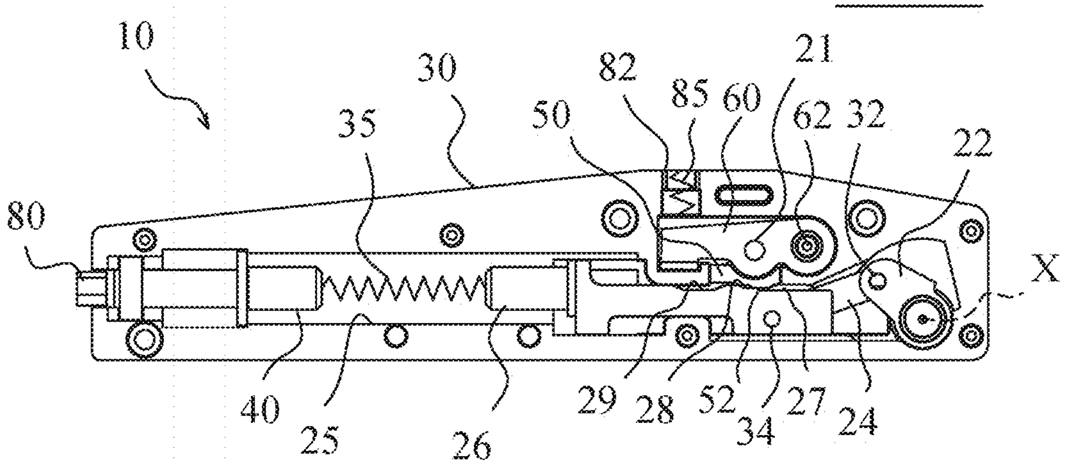
FIG. 3 illustrates a sectional view of the hinge of FIG. 1 in a configuration in which the panel with which it is associated is in the closing or opening step.

The raised element 52 of the skid 50 is further configured to be engaged with the raised element 28 on the body of the piston 26 during the translation movement of the piston 26 itself (FIG. 3).

The operation of the hinge 10 according to an embodiment of the invention takes place according to the following methods.

In FIG. 2 the hinge 10 is in a configuration in which the panel with which it is associated is open.

In this configuration, the spring 35 is in its maximum compression position and exerts a force on the piston 26 in an axial direction, but the connecting rod 24 is aligned with the piston 26 and with the hinging points 32 and 34 and therefore the force exerted by the spring 35 is balanced and the panel can remain open.

When the panel is closed, it is rotated along the vertical axis X and being connected to the prismatic rod 70, said rod makes the crank 22 rotate in the clockwise sense in FIG. 3.

At this point, as the rotation of the crank 22 causes a rotary translation movement of the connecting rod 24 that makes the connecting rod 24 no longer aligned with the direction of the force exerted by the spring 35 and therefore said spring 35 is free to push the piston 26 towards the right in FIG. 3, i.e. towards the axis of rotation X, contributing to the closure of the panel.

In the meantime, the closure of the panel is braked by the brake 100 as when the piston 26 moves towards the axis of rotation X, the raised element 28 on the body of the piston 26 is engaged with the raised element 52 of the skid 50.

In turn the skid 50 is engaged with a concave surface 53 thereof on the convex surface 63 of the lever 60 causing a small rotation of the lever 60 about the fulcrum 62 thereof, where said lever 60 is pushed upwards in FIG. 3 and is braked by the resistance of the spring 85, while it performs at the same time an oscillation about the axis 21.

Therefore, the combination of the lever 60 and of the spring 85 act as a brake adapted to slow down the stroke of the piston 28 during the closure of the door panel to prevent the latter banging in an uncontrolled way against the frame of the refrigerated cabinet.

In other words, the lever 60 operates like a class 3 lever where the power exerted by the piston 26, due to its raised element 28 that acts on the corresponding raised element 52 of the skid 50 is positioned between the fulcrum 62 of the lever 60 and the resistant force exerted by the spring 85 on the lever 60 itself.

Therefore, in general, the lever 60, in oscillation, passes from a first position in which the lever 60 does not interfere with the movement of the piston 26, to a second position in which the lever 60 interacts with the piston 26 to brake the closing movement of the panel to which the hinge 10 is connected.

The stroke of the piston 26 continues until it reaches the position of FIG. 4 and the panel with which the hinge 10 is associated is closed.

In this position the raised element 52 of the skid 50 is engaged with the distal seat 29 with respect to the crank 22 of the piston.

In this final closing step, when for example 10°-20° remain until the complete closure of the panel, due to the mentioned configuration of the skid 50 and of the piston 28, the braking effect is reduced and/or eliminated.

This solution has the advantage, for example, that if a user opens the panels of the door by mistake and then changes his/her mind and releases the semi-open panels, they automatically close being thrust by the spring 35 preventing the external heat entering the refrigerated cabinet.

It is also to be noted that the hinge 10 represented in FIGS. 1-4 was drawn under the hypothesis that the prismatic rod 70 was directed downwards (see FIG. 1) and therefore such hinge 10 was placed at the top and on the left hand side with respect to a user who is to open the panels of a refrigerated cabinet.

However, the same hinge 10 is in a certain sense "reversible" the prismatic rod 70 being able to be mounted so as to be directed upwards in FIG. 1.

In this configuration, the hinge 10 can be placed at the top and on the right hand side with respect to a user needing to open the panels of a refrigerated cabinet.

Therefore, to provide a refrigerated cabinet with two hinges it is sufficient to duplicate the structure of the hinge 10 with consequent cost savings.

The invention thus conceived is susceptible to several modifications and variations, all falling within the scope of the inventive concept illustrated.

Moreover, all the details can be replaced by other technically equivalent elements.

In practice, the materials used, as well as the contingent shapes and sizes, can be whatever according to the requirements without for this reason departing from the scope of protection of the following claims.

The invention claimed is:

1. A hinge for closing panels of the access opening of refrigerated cabinets, where said hinge comprises:

a casing that can be fixed to a fixed frame of the access opening, where said casing contains a mechanism configured to allow the rotation of said panel about an axis between a closed position and an open position of the access opening of the refrigerated cabinet, an elastic return means to allow the return from the open position to the closed position of the panel; and a braking element configured to interact with the aforesaid mechanism to brake the closing movement of the panel generated by said elastic return means, wherein the mechanism configured to allow the rotation of said panel about the axis comprises a crank configured to be placed in rotation by the opening and closing movement of said panel, said crank being kinematically connected to a connecting rod in turn connected to a piston, wherein said elastic return means for the return from the open position to the closed position of the panel comprises a spring configured to act on the piston and assuming a maximum compression configuration, when the piston is at a maximum distance position with respect to the axis, and a maximum extension configuration, when the piston is at a minimum distance position with respect to the axis.

2. The hinge according to claim 1, wherein the braking element comprises a lever configured to interact in oscillation with the mechanism that allows the rotation of said panel about the axis, where said oscillation movement takes place from a first position in which the lever does not interfere with the movement of the aforesaid mechanism to a second position wherein said lever interacts with the aforesaid mechanism to brake the closing movement of the panel to which the hinge is connected.

3. The hinge according to claim 2, wherein the oscillation movement of said lever about a fulcrum thereof is opposed by the resistance of an additional spring acting on the aforesaid lever.

4. The hinge according to claim 3, wherein the braking element further comprises a skid provided with a surface configured to be engaged with a corresponding surface pertaining to said lever.

5. The hinge according to claim 1, wherein in an open position of the panel, the spring is in its maximum compression position and exerts a force on the piston in an axial direction, where said force is balanced by the alignment of the connecting rod with the piston itself so as to keep the panel open.

6. The hinge according to claim 4, wherein the piston has a raised element, where said raised element is adapted to interact with a corresponding raised element pertaining to the skid so that said skid acts on the lever pressing it against the additional spring, where said additional spring acts on the lever bringing the lever into the second position so as to slow down the stroke of the piston.

7. The hinge according to claim 4, wherein the piston has a seat being distal with respect to the crank, where said distal seat is adapted to interact with a corresponding raised element pertaining to the skid so that the additional spring acting on the lever brings said lever back into the first position allowing the sliding of the piston by interrupting the braking action of the braking element.

8. The hinge according to claim 4, wherein the force exerted by the additional spring acting on the lever and the force exerted by the spring acting on the piston are adjustable.

* * * * *